(12) United States Patent
Shikama et al.

(10) Patent No.: US 9,501,166 B2
(45) Date of Patent: Nov. 22, 2016

(54) DISPLAY METHOD AND PROGRAM OF A TERMINAL DEVICE

(71) Applicant: Sony Corporation, Tokyo (JP)

(72) Inventors: Mari Shikama, Tokyo (JP); Takeshi Ogita, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 50 days.

(21) Appl. No.: 14/672,769

(22) Filed: Mar. 30, 2015

(65) Prior Publication Data

US 2016/0291744 A1    Oct. 6, 2016

(51) Int. Cl.
| | |
|---|---|
| *G06F 3/041* | (2006.01) |
| *G06F 3/044* | (2006.01) |
| *G06F 3/0481* | (2013.01) |
| *G06F 3/0488* | (2013.01) |

(52) U.S. Cl.
CPC ............ *G06F 3/0412* (2013.01); *G06F 3/044* (2013.01); *G06F 3/0488* (2013.01); *G06F 3/04817* (2013.01)

(58) Field of Classification Search
CPC ................. G06F 3/044; G06F 3/0416–3/0418
See application file for complete search history.

(56) References Cited

U.S. PATENT DOCUMENTS

| | | | | |
|---|---|---|---|---|
| 7,800,592 | B2* | 9/2010 | Kerr ....................... | G06F 1/1626 345/173 |
| 8,368,658 | B2* | 2/2013 | Brisebois ............ | G06F 3/03547 345/156 |
| 8,497,847 | B2* | 7/2013 | Brisebois ............ | G06F 3/03547 345/156 |
| 8,719,719 | B2* | 5/2014 | Cohen ................. | G06F 3/04886 345/173 |
| 8,937,609 | B2* | 1/2015 | Yoshida ................ | G06F 3/0416 345/174 |
| 8,976,154 | B2* | 3/2015 | Miyamoto ............. | G06F 3/041 345/174 |
| 2006/0197750 | A1* | 9/2006 | Kerr ....................... | G06F 1/1626 345/173 |
| 2010/0134423 | A1* | 6/2010 | Brisebois ............ | G06F 3/03547 345/173 |
| 2011/0074692 | A1* | 3/2011 | Causey ................. | G06F 3/0216 345/169 |
| 2011/0242025 | A1* | 10/2011 | Wen ..................... | G06F 3/04883 345/173 |
| 2012/0306806 | A1* | 12/2012 | Yang ..................... | G06F 3/0416 345/174 |
| 2013/0076639 | A1* | 3/2013 | Brisebois ............ | G06F 3/03547 345/169 |
| 2013/0321334 | A1* | 12/2013 | Yoshida ................ | G06F 3/0416 345/174 |
| 2014/0078318 | A1* | 3/2014 | Alameh ................ | G06F 3/0304 348/207.99 |
| 2014/0132541 | A1* | 5/2014 | Miyamoto ............. | G06F 3/041 345/173 |
| 2014/0320420 | A1* | 10/2014 | Ida .......................... | G06F 3/044 345/173 |
| 2014/0362023 | A1* | 12/2014 | Fujii ..................... | G06F 1/1652 345/174 |
| 2015/0153803 | A1* | 6/2015 | Tokutake .................. | G06F 1/32 713/323 |
| 2015/0253856 | A1* | 9/2015 | de los Reyes ...... | G06F 3/04883 345/174 |
| 2015/0277539 | A1* | 10/2015 | Chueh ................... | G06F 1/3262 345/178 |
| 2015/0286334 | A1* | 10/2015 | Simmons ................ | G06F 3/044 345/174 |
| 2015/0363036 | A1* | 12/2015 | Nasu ..................... | G06F 3/0416 345/173 |
| 2015/0363585 | A1* | 12/2015 | Gooding ................ | G06F 21/32 726/19 |
| 2016/0034138 | A1* | 2/2016 | Xia ........................ | G06F 3/0488 715/811 |
| 2016/0195986 | A1* | 7/2016 | Kwon ................... | G06F 3/0416 345/174 |

FOREIGN PATENT DOCUMENTS

JP    2012-247936    12/2012

* cited by examiner

*Primary Examiner* — Patrick F Marinelli
(74) *Attorney, Agent, or Firm* — Oblon, McClelland, Maier & Neustadt, L.L.P.

(57) ABSTRACT

An electronic device, including circuitry to detect, based on an output of a touch panel, a kind of finger that operates the touch panel; determine, based on the detected kind of the finger, an arrangement of display elements on a display formed on or integrally with the touch panel; and control the display to display the elements in accordance with the determined arrangement.

16 Claims, 15 Drawing Sheets

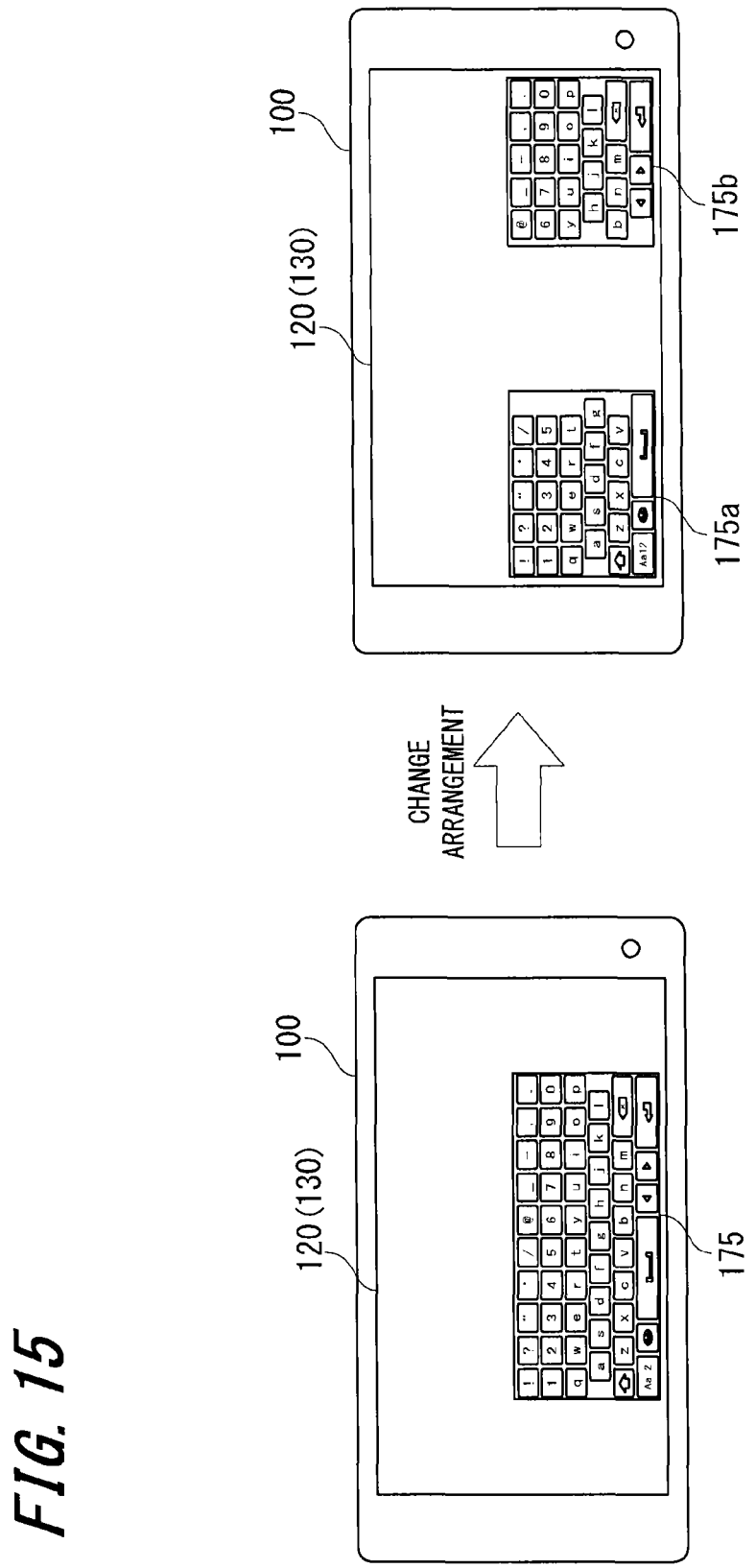

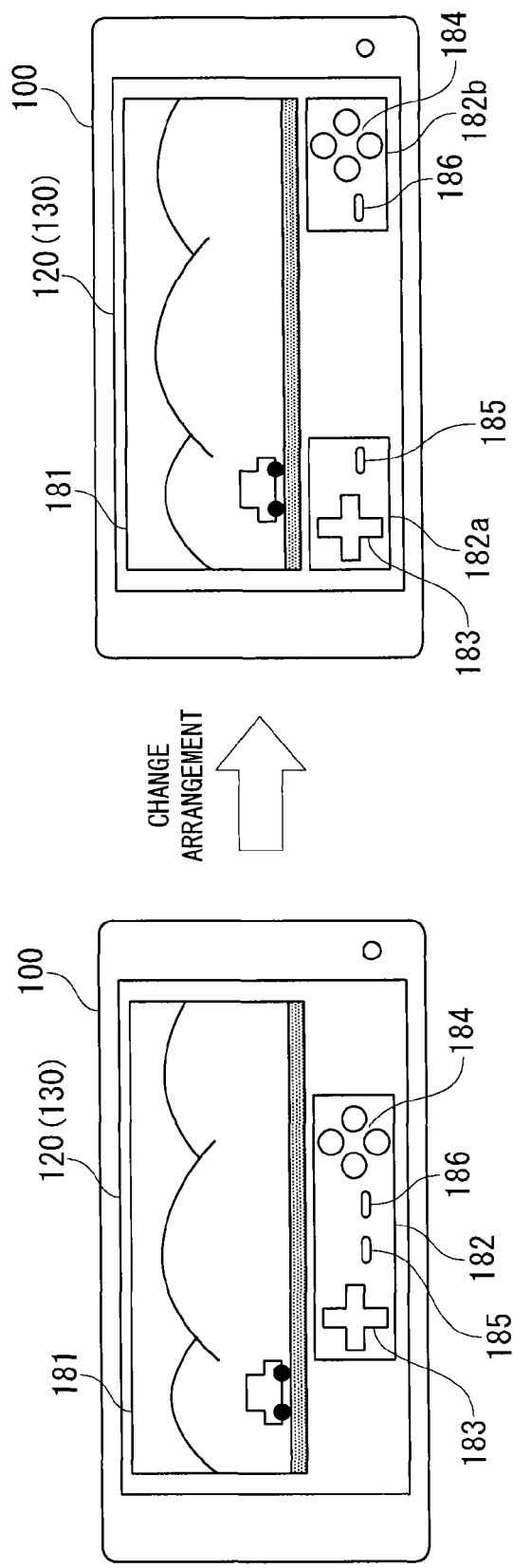

DISPLAY METHOD AND PROGRAM OF A TERMINAL DEVICE

FIELD

The exemplary embodiments described herein relate to display methods and programs of an electronic device.

BACKGROUND

In terminal devices, such as a smart phone and a tablet terminal, a touchscreen is used for operations or input. The touchscreen display may be operated by touch detection in which input operations are detected by an object making contact with the touchscreen and/or proximity detection in which input operations are detected by detecting an object's proximity in relation to a surface of the touchscreen.

The size of the display screen of terminal devices has been expanding to increase the information content in the touchscreen display, or to improve visibility.

However, as the size of a display screen is expanded, when operating the terminal device in a single hand, it becomes more difficult for a user to perform touch input operations. Therefore, as recognized by the inventor, the operations which are performed a finger of the user's hand that holds the terminal device become more difficult.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment, there is provided an terminal device, including: circuitry configured to detect, based on an output of a touch panel, a kind of finger that operates the touch panel; determine, based on the detected kind of the finger, an arrangement of display elements on a display formed on or integrally with the touch panel; and control the display to display the elements in accordance with the determined arrangement.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 15 is an exemplary layout change of the keyboard as the operation content; and FIG. 16 is an exemplary layout change of a controller of a game machine as the operation content.

DETAILED DESCRIPTION

Figure 1:
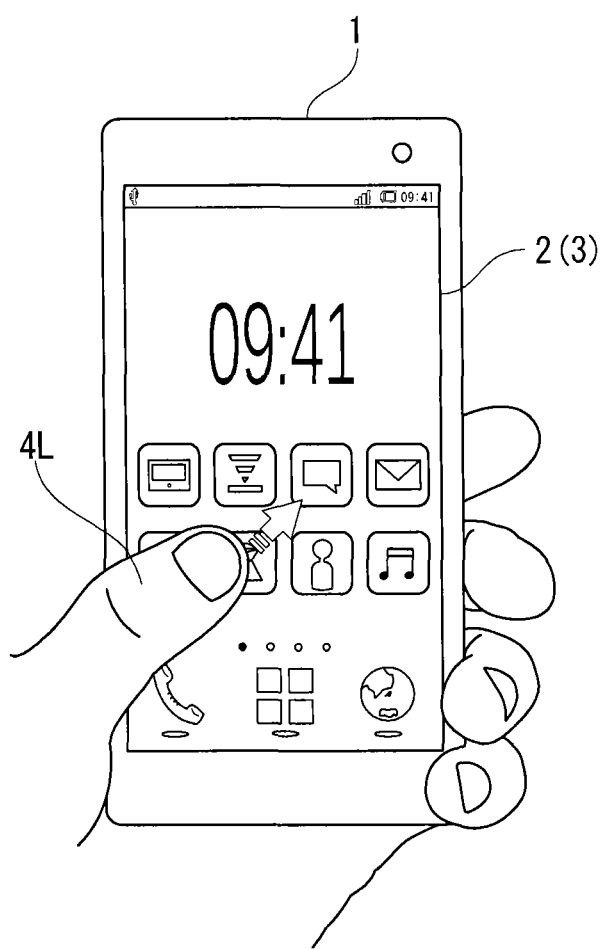
FIG. 1 is an exemplary graph that shows a terminal device holding with a left hand.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1 shows a terminal device 1 that is held by a user's left hand.

Several icons are displayed on a display screen 2 that is stacked on or formed integrally with a touchscreen 3 of the terminal device 1. In this configuration, the user's left thumb 4L may not be able to reach an icon or a key at a rightmost side displayed on the display screen 2.

In order to touch the icon and the key that are far away from a position of the finger, (e.g., the left thumb 4L in FIG. 1), the user must either switch the hand holding the terminal device, or select the icon or key with another hand. The action of switching hands, or using another hand, may be troublesome for some users.

Various type systems, such as a resistive film type system, and an electrostatic capacitive type system (also known as an electrostatic coupling system), can be used as position detection systems to detect indicators. For example, the finger or an electrostatic pen may be used to operate the touchscreen 3.

The electrostatic capacitive system includes an electrode formed by a predetermined pattern on the transparent substrate or the transparent film. The electrostatic capacitive system detects a change of the electrovalent-bond state between an electrically conductive film and the indicators (e.g., the finger and/or the electrostatic pen) at the time that the indicator is approaching, and the position of the indicator.

Various techniques to optimize the touchscreen structure of the electrostatic capacitive system are disclosed. The electrostatic capacitive type touchscreen detects a hovering state in which the finger has floated from the detector plane of the touchscreen through a hover function. In this disclosure, the terminal device detects the finger of one hand or both hands which exists in the vicinity of the detector plane of the touchscreen using the hover function. Moreover, the type of finger (e.g. the thumb or the index finger) is identified based on a difference of the electrostatic capacitance distribution that is obtained from a detection signal of the touchscreen.

The disclosed terminal device further includes a user-interface (UI) for operations that are based on the detected hand and fingers. By using the hover function, the terminal device can detect the finger which is used or may be used to touch screen, even the user has not actually touched the touchscreen.

Figure 2A:
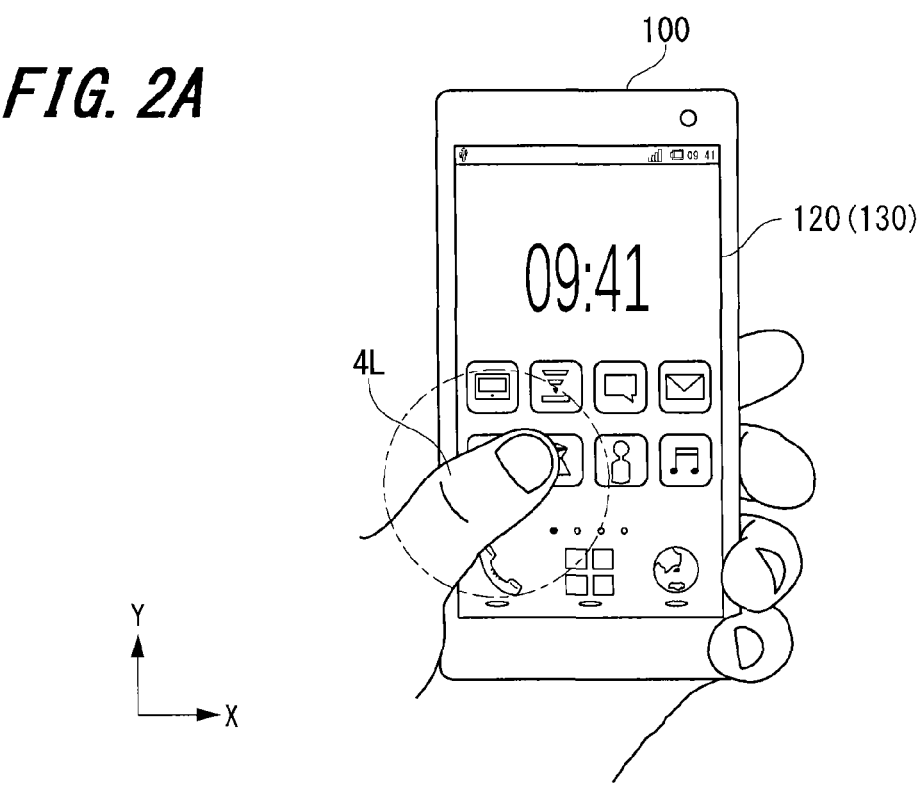
FIG. 2A is an exemplary graph that shows that the terminal device is held in a left hand and touched by a thumb of the left hand.
Figure 2B:
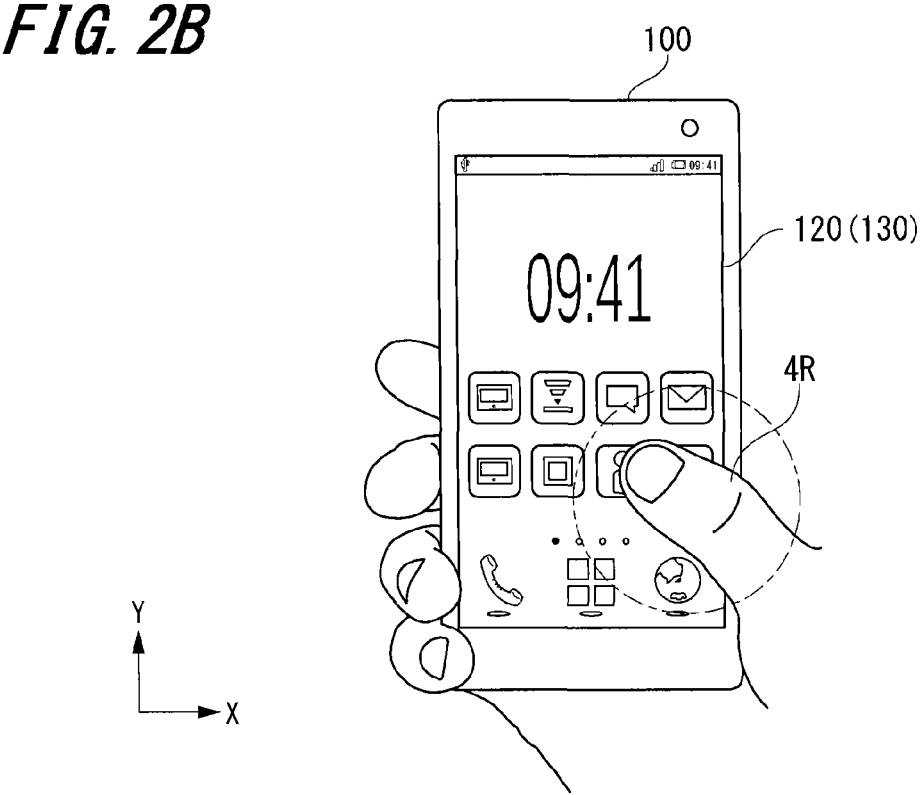
FIG. 2B is an exemplary graph that shows the terminal device touch screen is held in a right hand and touched by a thumb of the right hand.

FIG. 2A shows that the terminal device is held in a left hand and the touch screen is operated touched by the thumb of the left hand. FIG. 2B illustrates the terminal device being held by a right hand of a user with the touch screen being operated by the thumb of the right hand.

In both of the figures, several icons are displayed on the display screen 120 stacked on or formed integrally with the touch panel 130 of the terminal device. The detector plane of the touch panel 130 is touched by a left-hand thumb 4L. The range in which the left-hand thumb 4L can operate is the range of a circle shown with the dashed-dotted line in FIG. 2A. The range in which the right-hand thumb 4R can operate is the range of a circle shown with the dashed-dotted line in FIG. 2B.

Figure 3:
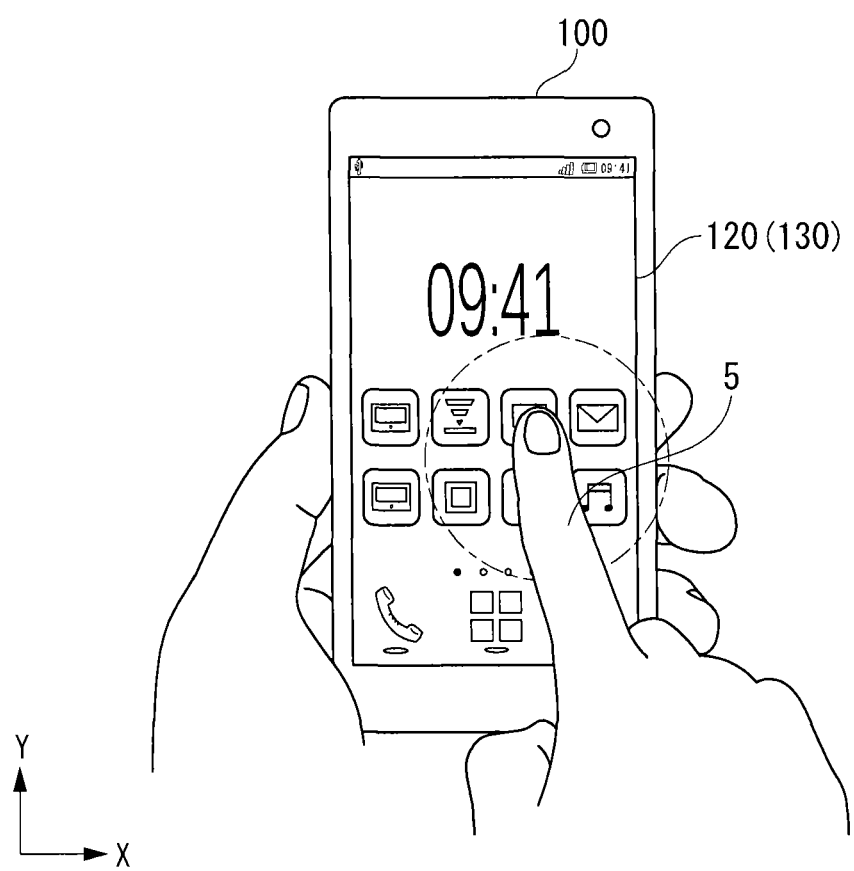
FIG. 3 is an exemplary graph that shows the terminal device touch screen is held in one hand and touched by an index finger of that hand.

FIG. 3 is exemplary graph that shows the touchscreen being held in one hand and touched by the index finger of another hand. In FIG. 3, the terminal device 100 is held with the left hand, and the touch panel 130 is touched by the index finger 5 of the right hand. In the state that the right hand is at a fixed location, the range that can be operated by the right-hand index finger 5 is the range of a circle shown with the dashed-dotted line.

However, if the right-hand position can be moved freely, the whole face of the touch panel 130 is touchable. On the other hand, as shown to FIG. 2A and FIG. 2B, the range, which the thumb can reach, is limited when the terminal device 100 is operated by the single hand. In addition, although FIG. 3 only illustrated the index finger, the operation of a middle finger is the same as the operation of the index finger.

Figure 4:
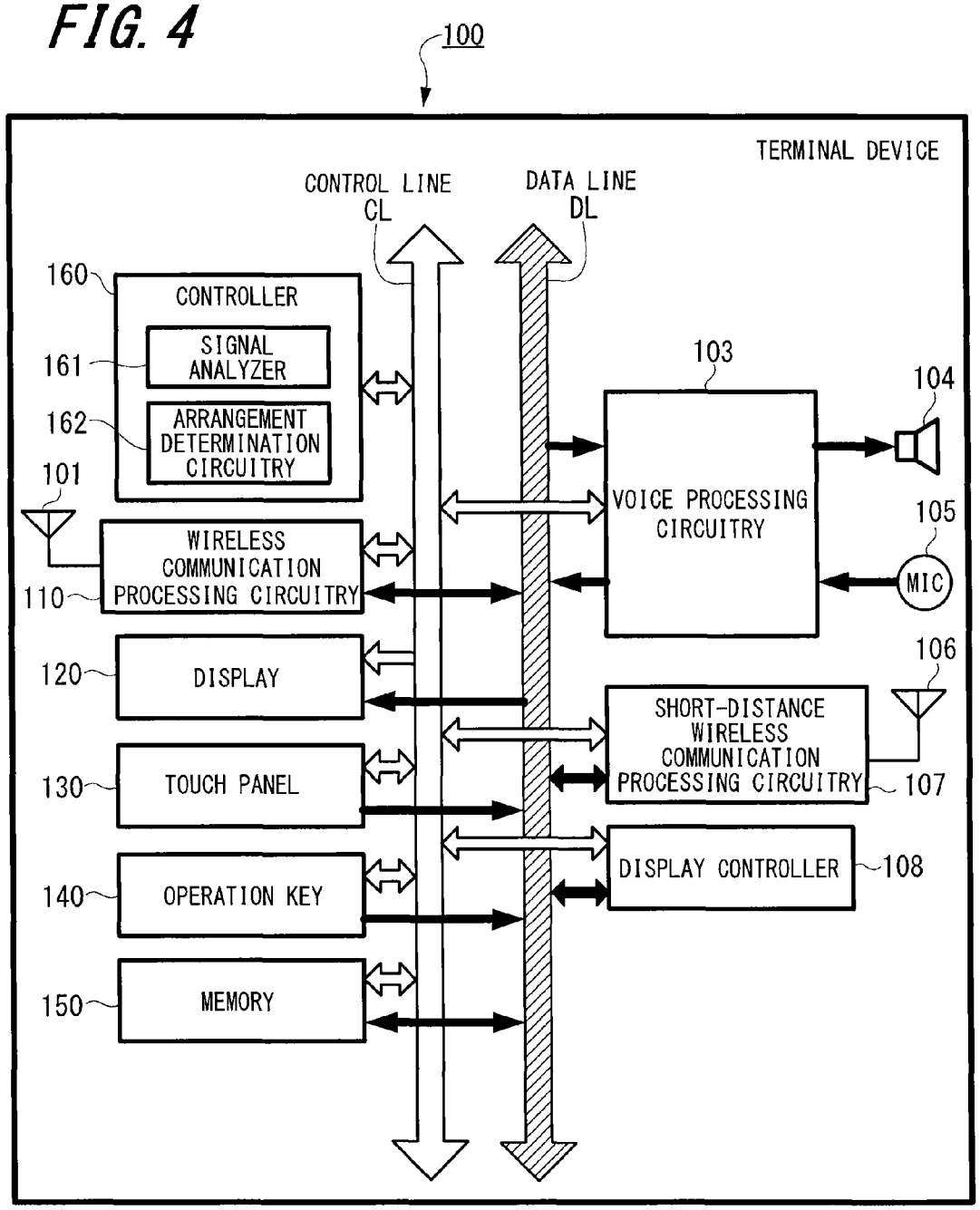
FIG. 4 is an exemplary block diagram of an internal structure of the terminal device.

FIG. 4 is a block diagram that shows an exemplary internal structural of the terminal device 100.

The terminal device 100 includes an antenna 101 to wirelessly communicate with a base station for radio telephones. The antenna 101 is connected to a wireless communication processing circuitry 110. A controller 160 controls wireless communication processing circuitry 110 to transmit and receive a radio signal. The controller 160 may be implemented, for example, by a Central Processing Unit (CPU).

The controller 160 transmits a control command to the wireless communication processing circuitry 110 through a control line CL. The controller 160 reads a program (e.g. software) stored by a memory 150 through the control line CL, and controls each part of the terminal device 100 by running the program. Moreover, the controller 160 detects a type of the finger that is used to operate the touch panel 130 based on a detection signal output from the touch panel 130. According to the result of the detection, the UI structure in the display 120 is determined.

The controller 160 is configured to function as a signal analyzer 161 and an arrangement determination circuitry 162. The signal analyzer 161 analyzes the detection signal of the electrostatic capacitance distribution output from the touch panel 130, and detects the object that touches the detector plane, or the object (e.g., a finger in this case) in the hovering state. That is, the signal analyzer 161 computes the electrostatic capacitance distributions of scanning directions (e.g., an X direction or a Y direction) of the touch panel 130 based on the received detection signal. The signal analyzer 161 further identifies the type of finger that operates the touch panel 130 based on the electrostatic capacitance distribution.

The arrangement determination circuitry 162 determines a display position of the display elements on the display screen based the finger identified by the signal analyzer 161. And the controller 160 generates the information about the control command of the determined display position to a display controller 108.

The display element includes a character string, an image (either a moving image or a still image), a window, an icon, or other than UI(s), such as an operation section.

The data of the program that are prepared in advance are stored by the memory 150, and the data generated by user is stored. The storage of the data to the memory 150 and the read-out of the data from the memory 150 are performed by the controller 160.

Voice data for a telephone call, which the wireless communication processing circuitry 110 received, is provided to the voice processing circuitry 103 through the data line DL.

The voice processing circuitry 103 performs a demodulation process of the voice data provided, and obtains an analog sound signal. The analog sound signal obtained in the voice processing circuitry 103 is sent to a speaker 104, and a sound is output from the speaker 104.

Moreover, the voice processing circuitry 103 converts the sound signal from the microphone 105 into the voice data. And the voice data converted in the voice processing circuitry 103 are sent to the wireless communication processing circuitry 110 through the data line DL. Moreover, the voice data sent to the wireless communication processing circuitry 110 are packetized and radio-transmitted. In addition, when the terminal device 100 is not equipped with a voice call function, it may not include the voice processing circuitry 103, the speaker 104, and the microphone 105.

When the terminal device 100 communicates data, transmits and receives a mail through networks, such as the internet, the wireless communication processing circuitry 110 transmits or receives information under the control of the controller 160. For example, the controller 160 stores the data received by the wireless communication processing circuitry 110 in the memory 150, and cooperates with the display controller 108 to display the stored data.

Moreover, the data stored in the memory 150 are sent to the wireless communication processing circuitry 110 as radio signals. When the data of the received mail needs to be deleted, the controller 160 erases the data stored in the memory 150.

The terminal device 100 also includes the display 120. The display 120 displays an image or a variety of information under the control of the controller 160. A liquid crystal display panel and an organic Electro-Luminescence (EL)

display panel are used as the display 120. Moreover, the terminal device 100 includes the touch panel 130. When the touch panel 130 is touched in the surface of the display by objects, such as a finger and a pen, or when the finger is in the hovering state, the touch panel 130 detects a touch position or a hovering position.

The touch panel 130 is implemented by laminating on or integrating with the display 120.

The touch panel 130 may be an electrostatic capacitance type touch panel. In the electrostatic capacitance type touch panel, the objects (e.g., the finger or the pen) touching the surface of the display panel, and the finger in a hovering state are detected based on the change of the electrostatic capacitance.

The data of the detected touch positions and the hovering positions is transmitted to the controller 160. The controller 160 activates applications based on the detected touch position and hovering position.

The touch position and the hovering position are described in the coordinate position of the X-axis (a horizontal axis) and Y-axis (a vertical axis), and the X-axis and the Y-axis are orthogonally crossed. The coordinate position which the touch panel 130 detects is not necessarily one point. That is, when the touch panel 130 is touched simultaneously in a wide range, the controller 160 detects the whole touched range. Also when the touch panel 130 is touched simultaneously in several ranges, the controller 160 detects the several touched ranges. When the finger is in the hovering state and simultaneously in several ranges, the controller 160 also detects the several ranges.

Moreover, the terminal device 100 includes an operation key 140. The operation information of the operation key 140 is transmitted to the controller 160. Moreover, the terminal device 100 includes a short-distance wireless communication processing circuitry 107 connected to an antenna 106.

The short-distance wireless communication processing circuitry 107 performs a short-distance communication with a nearby terminal device or an access point. The short-distance wireless communication processing circuitry 107 operates according to a wireless LAN standard, such as IEEE 802.11, or Bluetooth™. For example, the short-distance wireless communication processing circuitry 107 wirelessly communicates with the other party within the range about tens of meters.

Moreover, the terminal device 100 includes a display controller 108. The display controller 108 generates image data under the control of the controller 160. The display controller 108 receives information (e.g., control commands) including the arrangement the display elements on the display screen. And the display controller 108 generates image data of the display elements in the designated place. The controller 108 then outputs the image data to the display 120.

The terminal device 100 includes the power supply (e.g., a battery) that is not shown in FIG. 4. Each block in the terminal device 100 is driven by electric power provided from a power supply.

Figure 5:
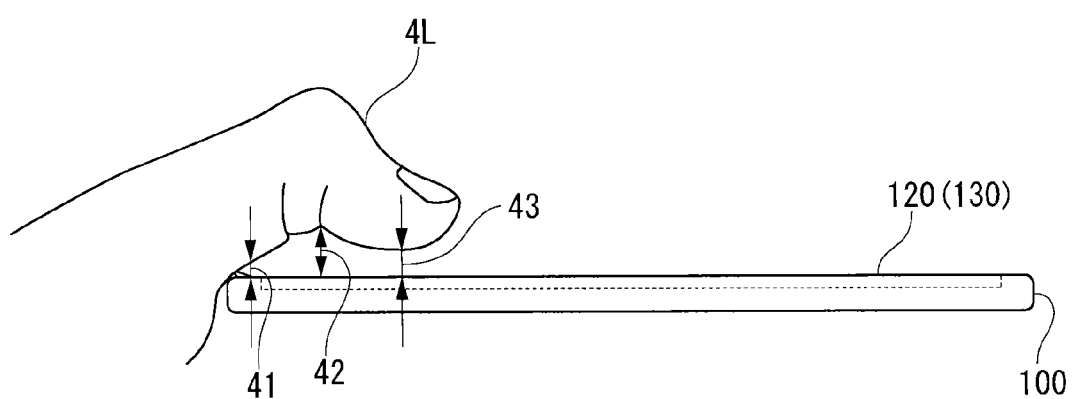
FIG. 5 is an exemplary graph that shows the thumb of the left hand in a hovering state.

FIG. 5 shows a mode that the left-hand thumb 4L is in the hovering state. As shown in FIG. 5, when the left-hand thumb 4L is operating the touch panel 130, the root of thumb 4L is always close to the display 120.

A first joint (between a distal phalanx and middle phalanges) and the pad of the thumb 4L may touch the display 120, or leave the display 120, according to a motion of the thumb 4L. Here, the display functions as a detector plane.

A distance 41 is a distance between the display 120 and the root of thumb 4L. A distance 42 is a distance between the display 120 and the first joint. The distance 43 is a distance between the detector plane and the pad of thumb 4L. The relationship among the distances 41, 43 and 43 is: 41<42<43.

Figure 6:
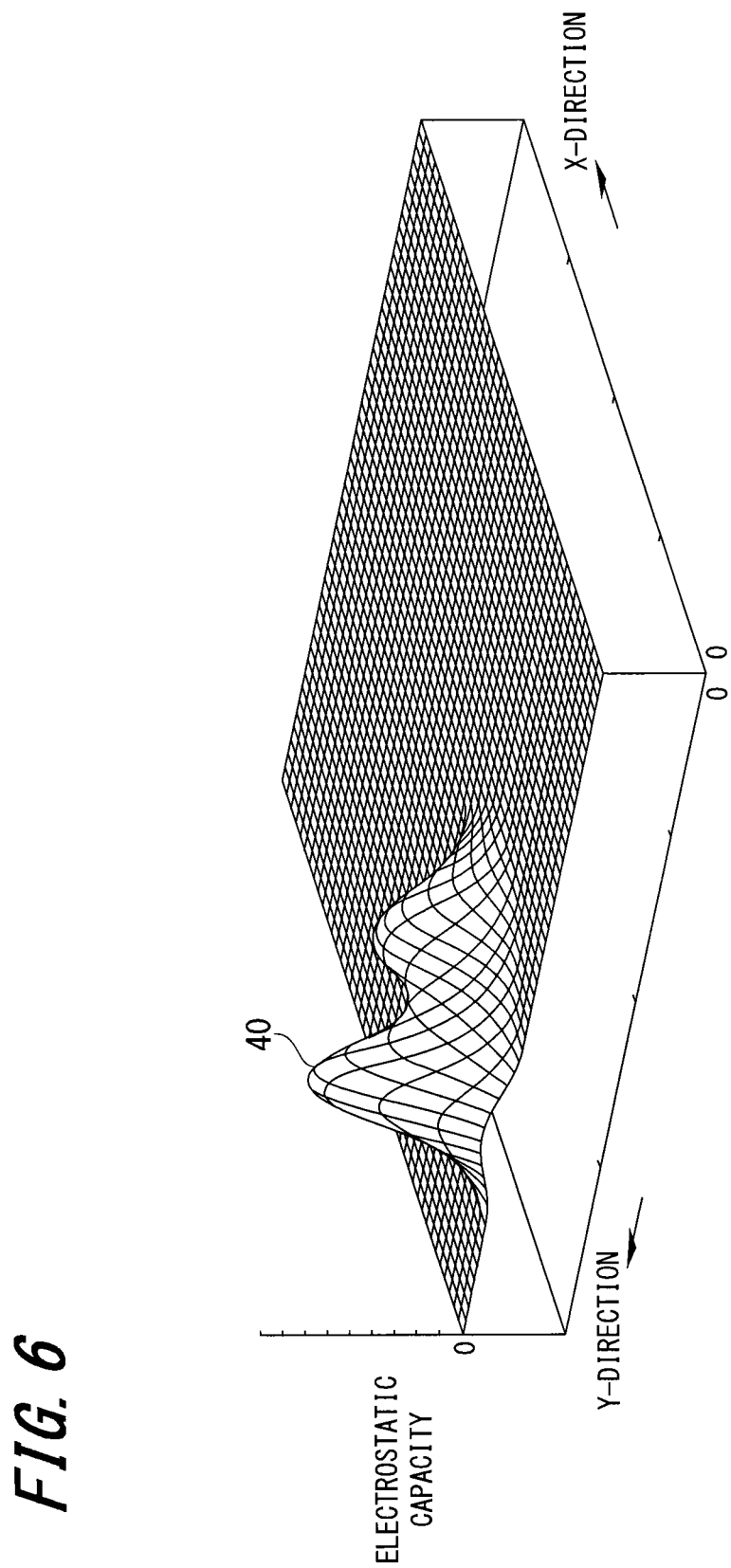
FIG. 6 is an exemplary three-dimensional distribution of electrostatic capacitances when the terminal device is operated by a thumb.

FIG. 6 is an exemplary graph of a three-dimensional distribution of the electrostatic capacitance when the terminal device is operated by the thumb. It shows the three-dimensional electrostatic capacitance distribution 40 when the distance of thumb 4L and the detector plane is as the distance shown in FIG. 5.

Figure 7:
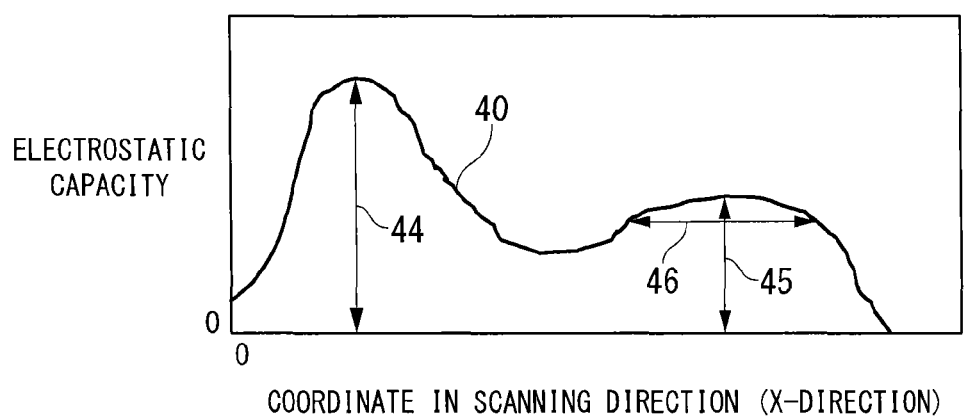
FIG. 7 is an exemplary two-dimensional distribution of the electrostatic capacitances when the terminal device is operated by a thumb.

FIG. 7 is an exemplary graph of a second-dimensional distribution of the electrostatic capacitance when the terminal device is operated by a thumb. FIG. 7 is distribution of the X direction of the electrostatic capacitance distribution 40 shown in FIG. 6.

The electrostatic capacitance distribution 40 in FIG. 6, FIG. 7 has two peaks.

The electrostatic capacitance distribution 40 has a large electrostatic capacitance value near the display 120. The electrostatic capacitance distribution 40 has a first peak corresponding to the root of the thumb 4L, and a second peak according to the pad of the thumb 4L.

Two peaks that appear in the curve of the electrostatic capacitance distribution 40 are connected. In addition, operations of pinching out or pinching in through the thumb and an index finger, also generate two peaks in electrostatic capacitance distribution. However, each peak generated by the pinching out or the pinching in exists independently, and the curves of two peaks in the electrostatic capacitance distribution are not connected.

Therefore, the signal analyzer 161 determines whether the terminal device 100 is held by the thumb of the hand, when two connected peaks are detected in electrostatic capacitance distribution.

The position of a peak of electrostatic capacitance distribution shows whether a left hand or a right hand is used to operate the terminal device 100.

In FIG. 6, the X-direction coordinate of the peak part in the electrostatic capacitance distribution 40 has risen from the position of 0.

Based on this, the signal analyzer 160 detects that the root of thumb 4L is contacting the left end of the touch panel 130.

On the other hand, when the peak part of the electrostatic capacitance distribution 40 has risen from the position where the X direction coordinate is the largest, the signal analyzer 160 detects that the root of a thumb is contacting the right end of the touch panel 130. Therefore, the operation is performed by the thumb of the right-hand.

In addition, the root of thumb 4L has the largest electrostatic capacitance value.

That is, in the value of the electrostatic capacitance, a peak height 44 of the root of the thumb 4L is higher than a peak height 45 of the pad of the thumb 4L.

When an electrostatic capacitance value is larger than predetermined value, a finger is contacting the display 120.

Moreover, the pad of thumb 4L has a diameter of about 15 mm for an adult, although there are some individual differences. Therefore, the electrostatic capacitance distribution 40 includes a big peak width 46 with the diameter of 15 mm that is corresponding to the pad of the thumb 4L.

Figure 8:
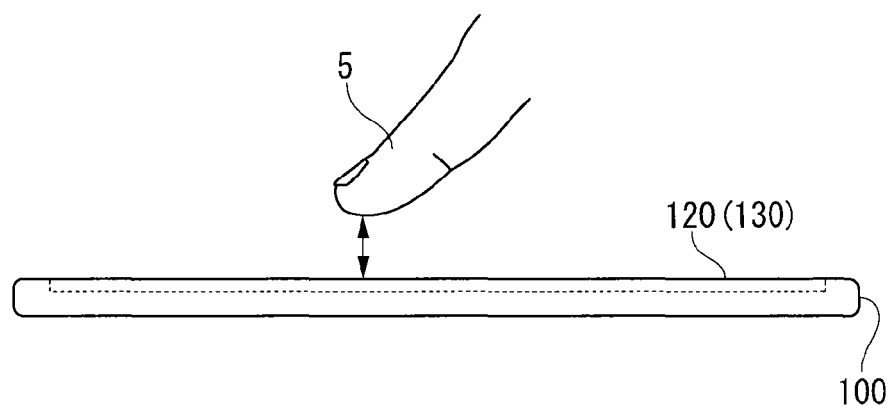
FIG. 8 is an exemplary graph that shows the index finger of the right hand in a hovering state.

FIG. 8 shows a mode that a right-hand index finger 5 is in the hovering state. As shown in FIG. 8, when the right-hand index finger 5 operates the touch panel 130, the index finger 5 is floating from the detector plane 120 except when the index finger 5 is touching the display 120.

Figure 9:
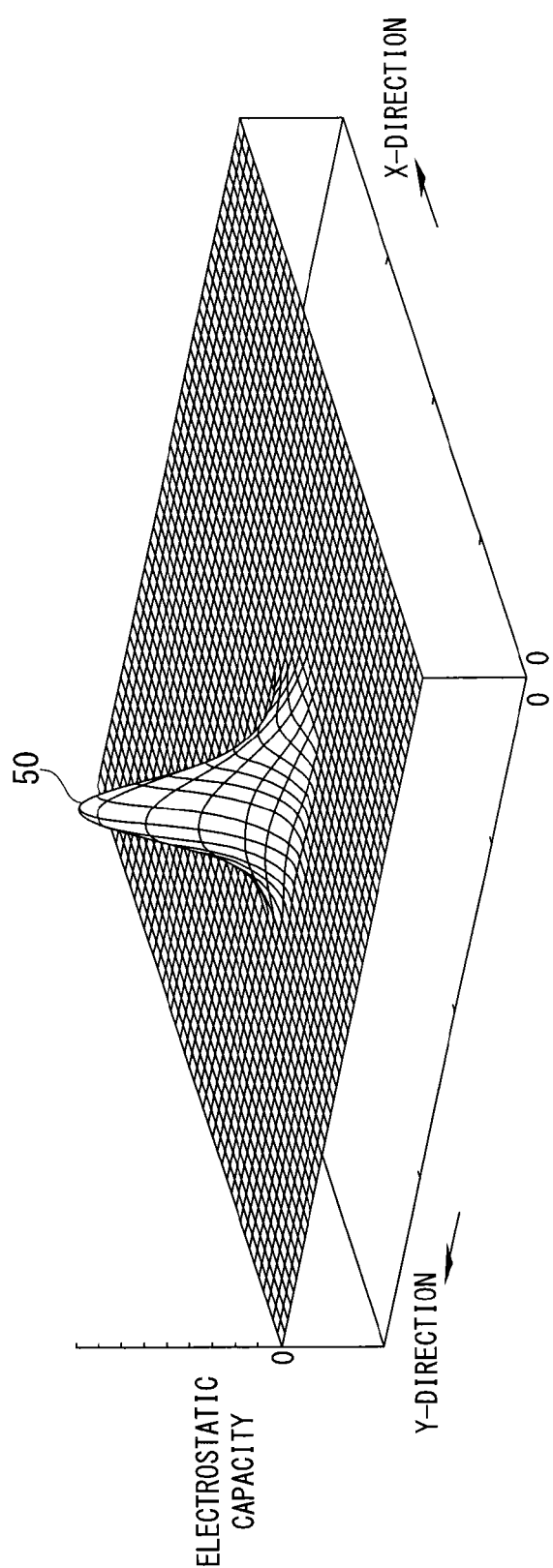
FIG. 9 is an exemplary three-dimensional distribution of the electrostatic capacitances when the terminal device is operated by the index finger.

FIG. 9 is an exemplary graph of a three-dimensional distribution of the electrostatic capacitance when the terminal device 100 is operated by the index finger. FIG. 9 shows the three-dimensional electrostatic capacitance distribution 50 when the index finger 5 is floated from the display 120 as shown in FIG. 8.

Figure 10:
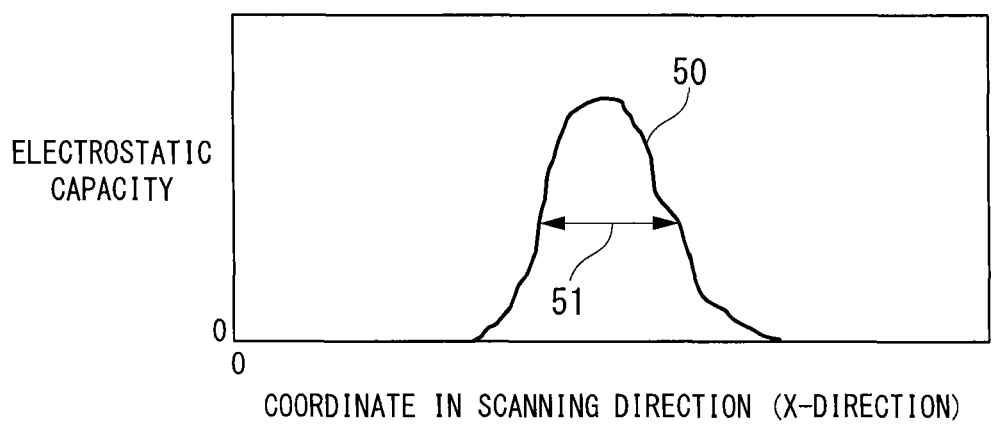
FIG. 10 is an exemplary two-dimensional distribution of the electrostatic capacitances when the terminal device is operated by the index finger.

FIG. 10 is an exemplary graph of a two-dimensional distribution when the display 120 is operated by the index finger. FIG. 10 is the distribution of the X direction of the electrostatic capacitance distribution 50 shown in FIG. 9.

As shown in FIG. 9 and FIG. 10, the electrostatic capacitance distribution 50 includes a peak. The peak is partly corresponding to the pad of the index finger 5.

Moreover, the pad of the index finger 5 has a diameter of about 7 mm, although there are individual differences of the pad of the index finger 5. Therefore, the peak width 51 that is corresponding to the pad of the index finger 5 is about diameter 7 mm. The peak width 51 of the index finger 5 is narrower than the peak width 46 of the thumb 4L.

Therefore, in FIGS. 5-7, the thumb is identified by the presence of two connected peaks in the electrostatic capacitance distribution. The finger other than the thumb may be identified by the absence of two connected peaks in electrostatic capacitance distribution.

An appropriate threshold value can also be set to identify thumb 4L from the index finger 5. When the peak width in electrostatic capacitance distribution is larger than the threshold value, the signal analyzer 161 identifies that the distribution is the pad of the thumb. When the peak width is smaller than the threshold value, the signal analyzer 161 identifies that the distribution is the pad of the index finger. The pad of a middle finger is identified by the method that is similar to identify the index finger.

Figure 11:
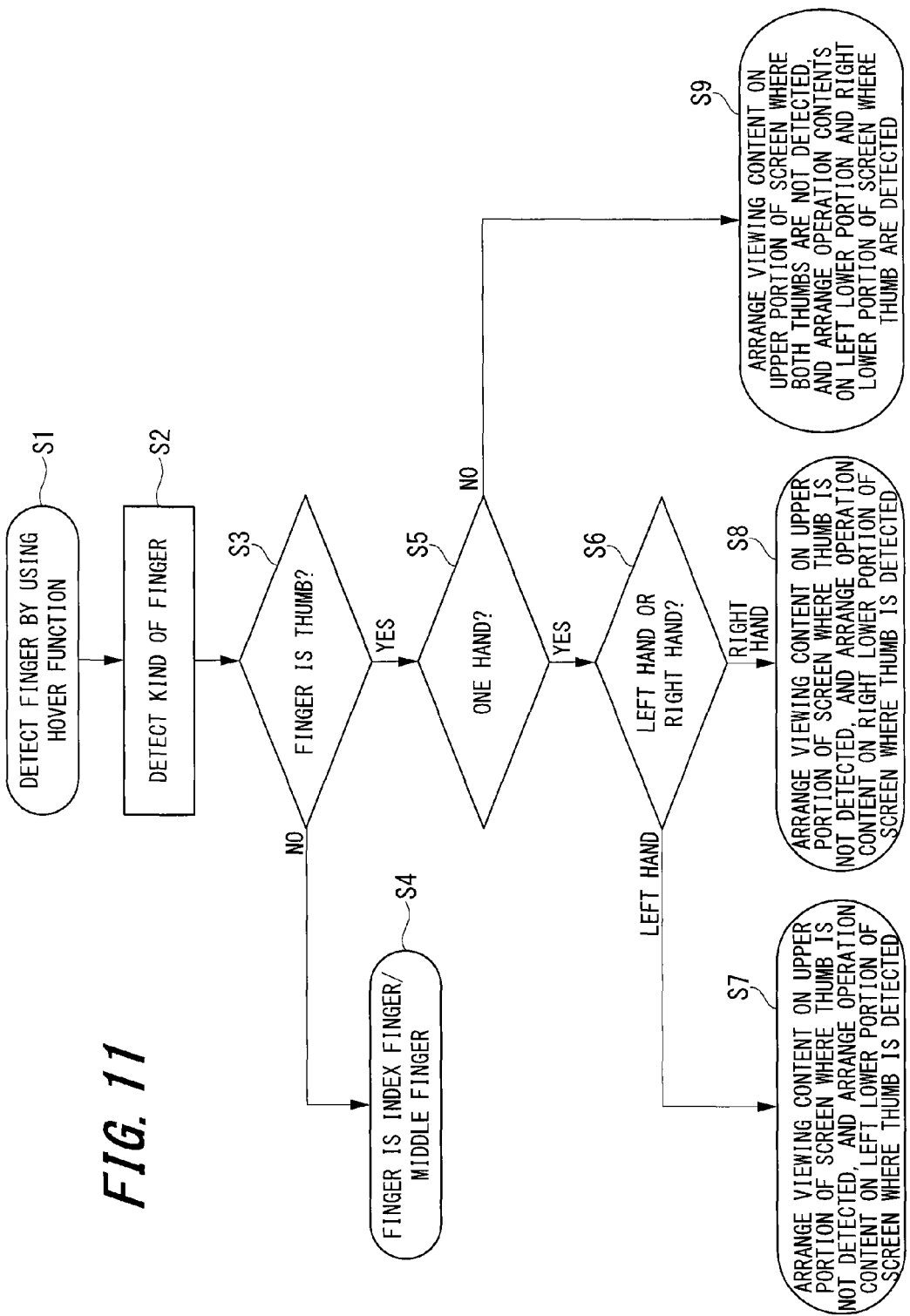
FIG. 11 is an exemplary control flow chart of the terminal device.

FIG. 11 is a flowchart which shows the control flow of the controller 160.

At step S1, the signal analyzer 161 detects the finger which is used or may be used to touch screen through the hover function.

At step S2, the signal analyzer 161 identifies the type of finger used or may be used for operation of the touch panel 130 based on the electrostatic capacitance distribution obtained from the detected signals.

At step S3, the signal analyzer 161 identifies whether the finger identified is a thumb, based on the existence of the two connected peaks in the electrostatic capacitance distribution in one scanning direction of the touch panel 130.

When the signal analyzer 161 identifies that the finger identified is not the thumb, the signal analyzer 161 goes to step S4.

At step S4, the signal analyzer 161 identifies whether the finger identified is the index finger or the middle finger.

When the signal analyzer 161 detects that the finger identified is the thumb, the signal analyzer goes to step S5.

At step S5, the signal analyzer 161 determines whether the finger in the hovering state is the finger of the hand that holds the terminal device 100. When the two connected peaks exist in electrostatic capacitance distribution only at one place, the signal analyzer 161 determines that the finger in the hovering state is the finger of the hand that holds the terminal device 100.

When the signal analyzer determines the finger in the hovering state is not the finger of the hand that holds the terminal device 100, step S9 is performed.

When the signal analyzer determines the finger in the hovering state is the finger of the hand that holds the terminal device 100, step S6 is performed.

At step S6, the signal analyzer 161 further determines whether the finger in the hovering state is the left-hand finger or the right-hand finger.

When the finger in the hovering state is determined to be the left-hand finger, step S7 is performed.

When the finger in the hovering state is determined to be the right-hand finger, step S8 is performed.

At step S7, the arrangement determination circuitry 162 arranges viewing contents to display on the upper part of the display 120 where the thumb is not detected and is out of reach of the thumb. Moreover, the arrangement determination circuitry 162 arranges operation contents to display on the lower left part of the display 120 where the thumb is detected, and is within the reach of the thumb.

The display controller 108 generates image data according to the arrangement of the display element determined by the arrangement determination circuitry 162, and outputs the image data to the display 120.

The display 120 displays the image data provided by the display controller 108. The finger shown on the display 120 has floated above the touch panel 130. The viewing contents are arranged in the position, where the viewing and listening of the view content is not blocked by the thumb.

The viewing content is a content that a user mainly views and listens. The viewing content is a still image, a moving image, or a screenshot that are shown to the users in various applications. The operation content is a content which is received from the touch operation. The operation contents may be icons, such as an operation button for the still image or the moving image, or a keyboard. Because the icon, which includes the files and the folder, is also operated by the user, it is displayed within the range that the finger (e.g. the thumb in this case) can reach.

On the other hand, the operation content is arranged at a range so that operation by the thumb can be performed. Since the icons that display the file and the folder are also operated by the user, they are displayed on the range which the thumb reaches.

At step S8, the arrangement determination circuitry 162 arranges the display element in a position contrary to the case of a left hand, when the finger is a right-hand finger in the determination processing of step S6.

The arrangement determination circuitry 162 arranges the viewing contents to the upper part of the display 120, and arranges the operation content in a screen lower right part of the display 120.

At step S9, when both hands are detected to operate the terminal device 100 in step S5, the arrangement determination circuitry 162 arranges viewing contents to the upper part of the screen where both thumbs are not located. Moreover, the arrangement determination circuitry 162 arranges the operation content in the lower left portion and lower right portion where both thumbs can reach.

The display elements, for different terminal device and applications, are different in numbers, sizes and shapes.

Therefore, the arrangement of the display elements for different terminal devices and applications may be saved in memory 150. The arrangement determination circuitry 162 reads the previous arrangement of the display elements in the memory 150, and determines the arrangement of the display elements based on the arrangements for similar terminal devices and applications.

Figure 12:
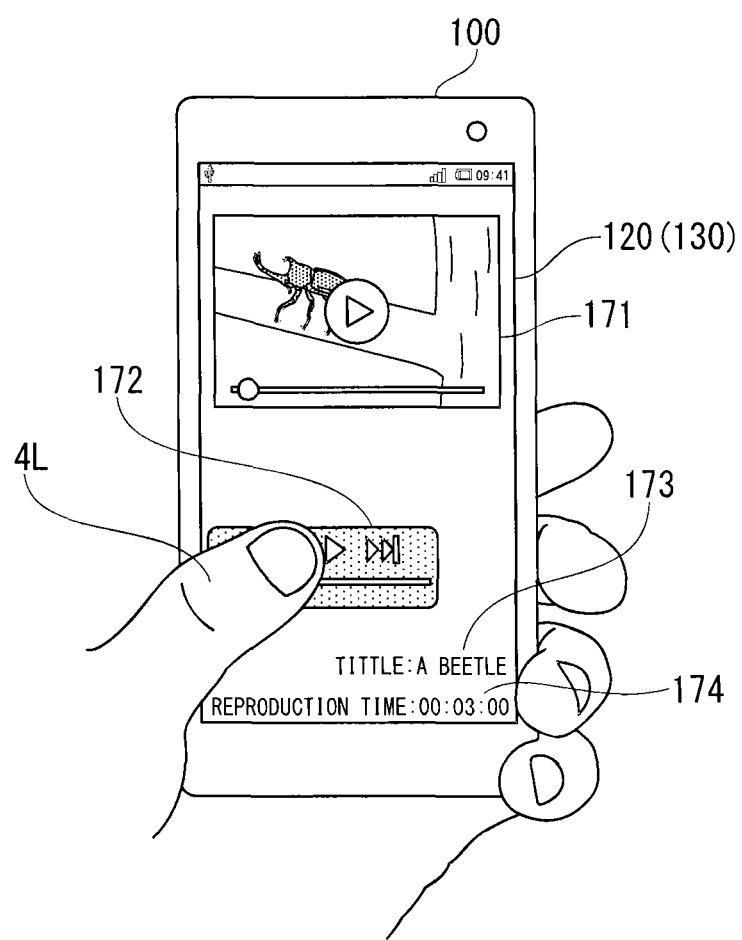
FIG. 12 is an exemplary user-interface when the terminal device is held with the left hand and is operated by the thumb of the left hand.

FIG. 12 is an exemplary graph of UI structure when left hand holds the terminal device 100. It shows a mode that the thumb of the left hand touches the left hand. As shown in FIG. 12, a viewing content 171 is displayed on the upper portion of the display 120. For example, the viewing content 171 is a moving image of "beetle" published by a contributions site which receives the post of a moving image via a network.

Since the left-hand thumb 4L does not reach the viewing content 171, the thumb 4L does not cover the display area of the viewing content 171. Moreover, the operation content 172 corresponding to the viewing content 171 is displayed on the lower left portion of the display 120. For example, a play button, a forward direction skip button, a reverse direction skip button, and a slider bar, etc., are components of the operation content 172.

The operation content 172 is operated by the left-hand thumb 4L. Moreover, less frequently used icons and content, and information such as text, are displayed on the lower right portion of the display 120. For example, less frequently used icons and contents are display elements, such as a reproduction time of a moving image and a filename.

In FIG. 12, "A BEETLE" is displayed on the lower right part of the display screen as a title 173 of the viewing content 171.

Furthermore, the reproduction time 274 "00:03:00" is displayed on the lower part of the title 173. The operation content 172, the title 173 and the reproduction time 174 may be placed at the upper and lower sides. However, for reasons of the structure of a hand, it is easier for the user to operate when the display element with higher operation frequency, such as the operation content 172, is arranged at an upper side of the display 120.

Figure 13A:
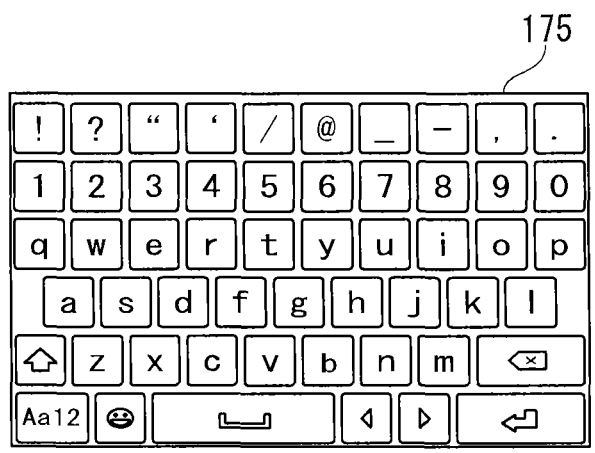
FIG. 13A is an exemplary display of a keyboard as an operation content.

FIG. 13A shows an example of a keyboard display 175. The keyboard is an operation content that is not displayed at the lower portion of the display in a holding hand side. When the touchscreen device is held by the left hand, the holding hand side is the left side of the display 120. When the touchscreen device is held by the right hand, the holding hand side is the right side of the display.

Figure 13B:
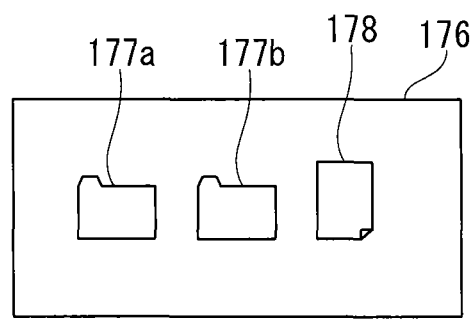
FIG. 13B is an exemplary display of a file folder as an operation content.

FIG. 13B shows examples of the display with file folders as the operation contents. The icons of file folders (177a and 177b), and the icon of the file 178 are displayed on the operation content display window 176.

Figure 14:
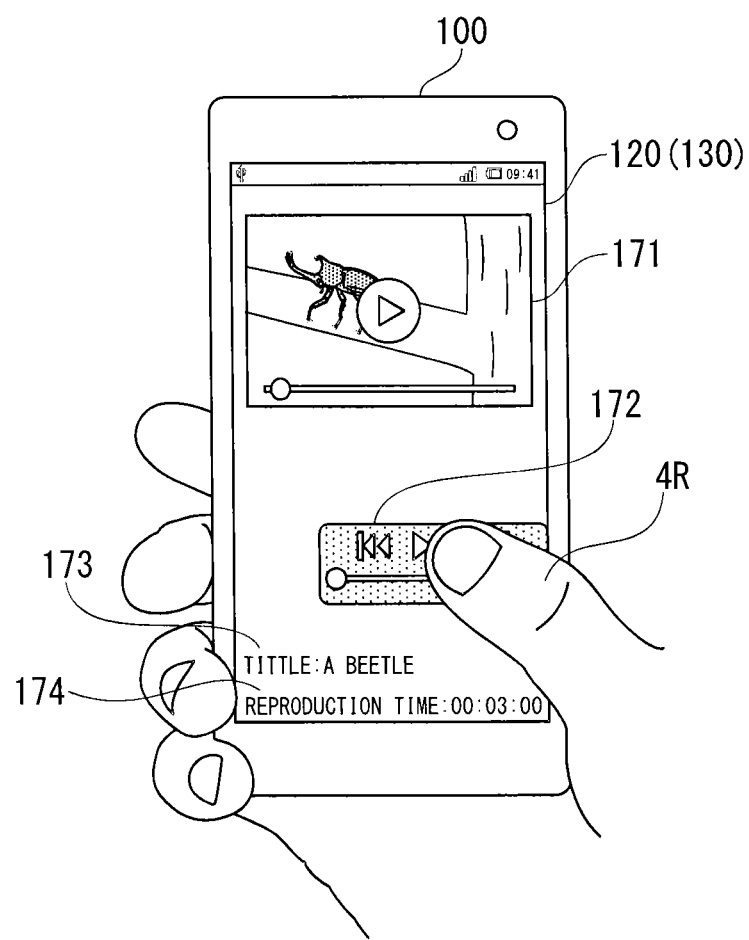
FIG. 14 is an exemplary user-interface when the terminal device is held with the right hand and is operated by the thumb of the right hand.

FIG. 14 shows a mode that the right hand holds the terminal device 100, and the thumb touches the terminal device 100. When the right hand holds the terminal device 100, the display elements are arranged in a position contrary to the case that the left hand holds the terminal device 100.

As shown in FIG. 14, the viewing content 171 is displayed on the upper portion of the display 120 similarly to the case that the terminal device 100 is held by the right hand as shown in FIG. 12. However, the operation content 172 corresponding to the viewing content 171 is displayed on the lower right portion of the display 120.

The user can operate the operation content 172 by the right-hand thumb 4R. Moreover, the title 173 and the reproduction time 174 are displayed on the lower left portion of the display 120.

FIG. 15 is an exemplary graph of layout change of the operation content, such as a division of a keyboard. A left side of FIG. 15 shows an example of arrangement of the keyboard 175 in a common terminal device. The keyboard 175 is displayed on the lower portion of the display 120.

A right side of FIG. 15 shows the example that a first keyboard 175a is arranged to the left lower side of the display 120, and a second keyboard 175b is arranged to the right lower side of the display 120. The first keyboard 175a corresponds to the left side of the keyboard 175, and the second keyboard 175b corresponds to the right side of the keyboard 175.

The key recommended to be typed by the left hand is the first keyboard 175a, and the key recommended to be typed by the right hand is the second keyboard 175b.

When the signal analyzer 161 detects that the user is operating with both hands, operability with the thumb of both hands is improved, by dividing a keyboard and arranging the divided the keyboard to the right and left of the lower portion of the display, as shown on the right side of FIG. 15.

In addition, although the terminal device 100 of FIG. 15 is perpendicularly positioned, when the terminal device 100 is vertically positioned, the division of the keyboard may also be applied.

As a specification of the terminal device 100, when displaying a keyboard, the first keyboard 175a and the second keyboard 175b may be displayed from the beginning. Or a selector switch which switches between a standard mode keyboard shown in the left side of FIG. 15 and a both-hand mode keyboard shown in the right side of FIG. 15 may be used to select operation mode.

For example, when the keyboard in that standard mode is displayed at the beginning, it switches to both-hands mode when the terminal device 100 detects that both hand are used to operate the device, the keyboard that is in the right side of FIG. 15 is shown in the display 120. Therefore, the arrangement of the keyboard is changed.

FIG. 16 is an exemplary graph of a layout change of the operation content, such as a controller 182 of a game machine.

The left side of FIG. 16 shows an exemplary arrangement of the controller in a terminal device 100.

In the terminal device 100 that is perpendicular positioned, a game screen 181 is displayed on the upper portion of the display 120, and the game controller 182 is displayed on the lower portion of the display 120.

For example, the game controller 182 includes a cross-key 183, an operation-button group 184, a selection button 185, and a start button 186.

The right side of FIG. 16 shows an example that a first game controller 182a is arranged at the lower left of the display 120, and a second game controller 182b is arranged at the screen lower right of the display 120.

The first game controller 182a corresponds to the left side of the game controller 182, and the second game controller 182b corresponds to the right side of the game controller 182.

Operability with the thumb of both hands is improved by dividing the game controller 182 and arranging divided parts to the right lower part and left lower portion of the lower portion of the display 120, respectively.

The terminal device 100 determines the UI structure of the display part according to the type of finger to operate the touch panel 130.

When the finger to operate is identified as the thumb, the UI is arranged according to the thumb of a right hand, a left hand, or both hands, and improves user's operability.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. An electronic device, comprising:
    circuitry configured to
        detect, based on an output of a touch panel, a kind of finger that operates the touch panel;
        determine, based on the detected kind of the finger, an arrangement of display elements on a display formed on or integrally with the touch panel;
        control the display to display the elements in accordance with the determined arrangement;
        detect that only one hand is used to operate the terminal device when two connected peaks in a scanning direction of the touch panel are in a detected electrostatic capacity distribution signal; and
        detect that two hands are used to operate the electronic device when one peak in the scanning direction of the touch panel is in the detected electrostatic capacity distribution signal.

2. The electronic device of claim 1, wherein the circuitry is configured to arrange displayed content at a first position that is out of reach of the finger when only one hand is detected to operate the electronic device.

3. The electronic device of claim 2, wherein the content is at least one of a still image, a moving image, and a screenshot that is shown in various applications.

4. The electronic device of claim 3, wherein the first position is at an upper portion of display.

5. The electronic device of claim 1, wherein the circuitry is configured to arrange operation content at a position that is within reach of the finger.

6. The electronic device of claim 5, wherein the operation content is an operation button for at least one of a still image, a moving image, and a keyboard.

7. The electronic device of claim 6, wherein the position is at a lower portion of the display on a side of the detected finger.

8. The electronic device of claim 1, wherein the circuitry is configured to arrange view content on a position that is out of a reach of both hands when both hands are detected to operate the electronic device.

9. The electronic device of claim 8, wherein the position is at an upper portion of the display.

10. The electronic device of claim 1, wherein the circuitry is configured to detect that the finger that operates the touch panel is a thumb of a user's left hand, and control the display to arrange operation content at a position that is within reach of a thumb of the left hand.

11. The electronic device of claim 10, wherein the position is at a left lower portion of the display.

12. The electronic device of claim 1, wherein the circuitry is configured to detect that the finger the operates the touch panel is a thumb of a user's left hand, and control the display to arrange operation content at a position that is within reach of a thumb of the left hand.

13. The electronic device of claim 12, wherein the position is at a right lower portion of the display.

14. The electronic device of claim 1, wherein the circuitry is further configured to divide the display elements into a left half portion and a right half portion, and generate a first operation content from the divided left half portion and a second operation content from the divided right half portion when it is detected that a user is operating the touch panel with both hands.

15. A non-transitory computer-readable medium including computer program instructions, which when executed by an electronic device, cause the electronic device to:
    detect, based on an output of a touch panel, a kind of finger that operates the touch panel;
    determine, based on the detected kind of the finger, an arrangement of display elements on a display formed on or integrally with the touch panel;
    control the display to display the elements in accordance with the determined arrangement;
    detect that only one hand is used to operate the terminal device when two connected peaks in a scanning direction of the touch panel are in a detected electrostatic capacity distribution signal; and
    detect that two hands are used to operate the electronic device when one peak in the scanning direction of the touch panel is in the detected electrostatic capacity distribution signal.

16. A method performed by an electronic device, the method comprising:
    detecting, based on an output of a touch panel, a kind of finger that operates the touch panel;
    determining, based on the detected kind of the finger, an arrangement of display elements on a display formed on or integrally with the touch panel;
    controlling the display to display the elements in accordance with the determined arrangement;
    detecting that only one hand is used to operate the terminal device when two connected peaks in a scanning direction of the touch panel are in a detected electrostatic capacity distribution signal; and
    detecting that two hands are used to operate the electronic device when one peak in the scanning direction of the touch panel is in the detected electrostatic capacity distribution signal.

* * * * *